(12) United States Patent
Hibst et al.

(10) Patent No.: US 7,495,121 B2
(45) Date of Patent: Feb. 24, 2009

(54) MO- AND V-CONTAINING MULTIMETAL OXIDE MATERIALS

(75) Inventors: Hartmut Hibst, Schriesheim (DE); Gerhard Cox, Bad Duerkheim (DE); Frieder Borgmeier, Mannheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 904 days.

(21) Appl. No.: 10/843,645

(22) Filed: May 12, 2004

(65) Prior Publication Data

US 2004/0229753 A1 Nov. 18, 2004

Related U.S. Application Data

(60) Provisional application No. 60/476,163, filed on Jun. 6, 2003.

(30) Foreign Application Priority Data

May 12, 2003 (DE) ................. 103 21 398

(51) Int. Cl.
C07C 253/00 (2006.01)
B01J 23/00 (2006.01)

(52) U.S. Cl. .............. 558/319; 502/312; 502/321; 502/353; 558/323

(58) Field of Classification Search ................ 502/312, 502/321, 353
See application file for complete search history.

(56) References Cited

U.S. PATENT DOCUMENTS

| 6,036,880 A | 3/2000 | Komada et al. |
| 6,063,728 A | 5/2000 | Hinago et al. |
| 6,143,916 A | 11/2000 | Hinago et al. |
| 6,171,571 B1 | 1/2001 | Bedard et al. |
| 6,428,765 B1 | 8/2002 | Bedard et al. |
| 6,734,136 B2 * | 5/2004 | Chaturvedi et al. ......... 502/215 |
| 7,005,403 B2 * | 2/2006 | Borgmeier et al. .......... 502/312 |
| 7,109,144 B2 * | 9/2006 | Hinago et al. ............... 502/312 |
| 2003/0187298 A1 | 10/2003 | Borgmeier et al. |
| 2003/0187299 A1 | 10/2003 | Machhammer et al. |

(Continued)

FOREIGN PATENT DOCUMENTS

DE 198 35 247 2/1999

(Continued)

OTHER PUBLICATIONS

Haas, et al., "Comparative electron microscopy and image analysis of oxy- and deoxy-hemocyanin from the spiny lobster *Panulirus interruptus*", Ultramicroscopy, (1993), pp. 426-435.

(Continued)

*Primary Examiner*—Cam N. Nguyen
(74) *Attorney, Agent, or Firm*—Oblon, Spivak, McClelland, Maier & Neustadt, P.C.

(57) ABSTRACT

Multimetal oxide materials which contain Mo and V and, if required, one or more of the elements from the group consisting of lanthanides, transition elements of the Periodic Table of the Elements and elements of the third to sixth main group of the Periodic Table of the Elements and which are prepared in the presence of an alkali metal other than Li and have the i-phase structure are used as active material in catalysts for partial gas-phase oxidations.

25 Claims, 5 Drawing Sheets

U.S. PATENT DOCUMENTS

Figure 1:
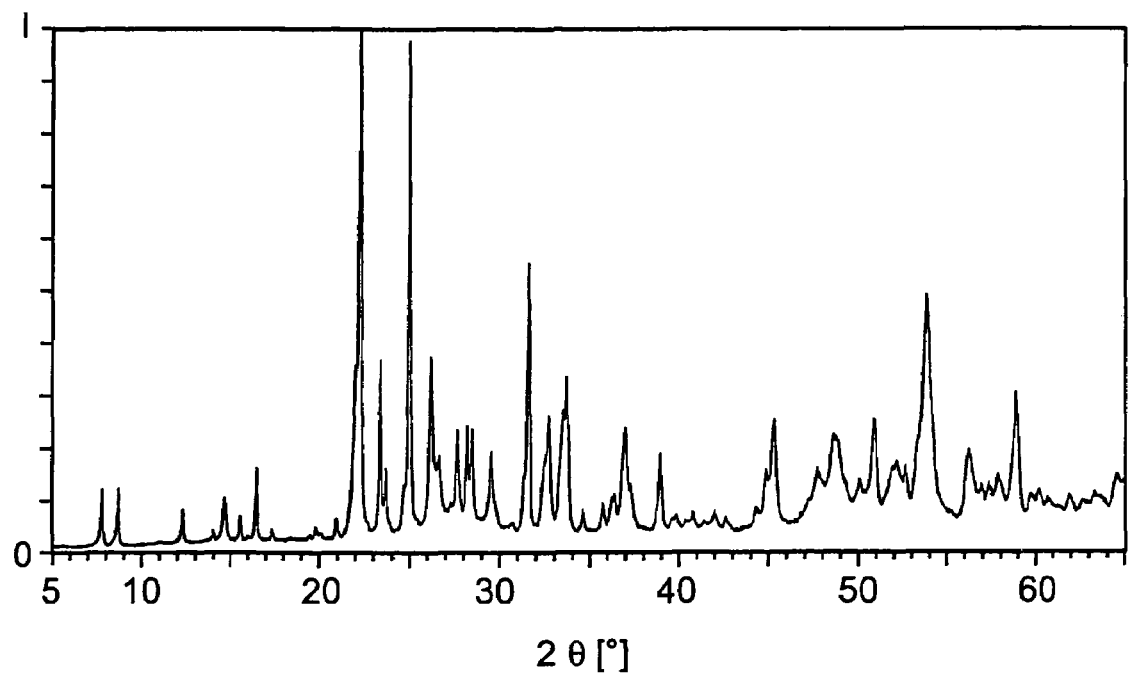

| | | | |
|---|---|---|---|
| 2004/0062870 | A1 | 4/2004 | Dieterle et al. |
| 2004/0082190 | A1 | 4/2004 | Borgmeier et al. |

FOREIGN PATENT DOCUMENTS

| | | |
|---|---|---|
| DE | 100 46 672 | 3/2002 |
| DE | 100 51 419 | 4/2002 |
| DE | 101 22 027 | 5/2002 |
| DE | 102 48 584 | 10/2002 |
| DE | 102 54 279 | 11/2002 |
| DE | 102 61 186 | 12/2002 |
| DE | 102 54 278 | 2/2004 |
| EP | 0 895 809 | 2/1999 |
| EP | 1 090 684 | 4/2001 |
| EP | 1 254 706 | 11/2002 |
| EP | 1 254 707 | 11/2002 |
| EP | 1 254 708 | 11/2002 |
| EP | 1 254 709 | 11/2002 |
| EP | 1 256 381 | 11/2002 |
| JP | 07/232071 | 9/1995 |
| JP | 11/169716 | 6/1999 |
| WO | WO 02/06199 | 1/2002 |

OTHER PUBLICATIONS

P. Millet, et al., A New Vanadium-Molybdenum Mixed Bronze Family with a Tunnel Structure: The Phases $A_x(Mo,V)_8O_{21}$ ($A=K^+$, $Rb^+$, $Cs^+$), Journal of Solid State Chemistry, (2002), vol. 163, pp. 210-217.

Kihlborg, et al., "Low Members of the Intergrowth Tungsten Bronze Family by Partial Substitution of Molybdenum for Tungsten", Journal of Solid State Chemistry, (2001), vol. 162, pp. 341-346.

Sundburg, et al., "$K_5Nb_9W_2O_{31}$: A New Tetragonal-Tungsten-Bronze-Related Structure, Deduced from HREM Images", Chemica Scripta (1998), vol. 28, pp. 77-80.

* cited by examiner

MO- AND V-CONTAINING MULTIMETAL OXIDE MATERIALS

The present invention relates to multimetal oxide materials of the formula I $$A_a[Mo_{5-b-c}V_bX_cO_d]_1 \quad (I),$$

where
A is at least one of the elements from the group consisting of $NH_4$, Na, K, Rb, Cs and Tl;
X is one or more of the elements from the group consisting of La, Ce, Pr, Nd, Pm, Sm, Eu, Gd, Tb, Dy, Ho, Er, Tm, Yb, Lu, Ti, Zr, Hf, Nb, Ta, W, Mn, Re, Fe, Co, Ni, Cr, Ru, Rh, Pd, Os, Ir, Pt, Cu, Ag, Au, Zn, Cd, Hg, B, Al, Ga, In, C, Si, Ge, Sn, Pb, P, As, Sb, Bi, S, Se and Te;
a is from 0.1 to 1;
b is from 0.25 to 4.5; and
c is from 0 to 4.5,
with the proviso that $b+c \leq 4.5$, whose X-ray diffractogram contains the following X-ray diffraction pattern XP, reproduced in the form of interplanar spacings d [Å] independent of the wavelength of the X-rays used,

| d [Å] |
| --- |
| 3.06 ± 0.2 |
| 3.17 ± 0.2 |
| 3.28 ± 0.2 |
| 3.99 ± 0.2 |
| 9.82 ± 0.4 |
| 11.24 ± 0.4 |
| 13.28 ± 0.5. |

Multimetal oxide materials which contain Mo and V and at least two elements selected from the group consisting of lanthanides, transition elements of the Periodic Table of the Elements and elements of the third to sixth main group of the Periodic Table of the Elements and whose X-ray diffractogram contains the X-ray diffraction pattern XP are known (cf. for example DE-A 10248584, DE-A 10254279, DE-A 10051419, DE-A 10046672, DE-A 10261186, EP-A 1090684, DE-A 19835247, DE-A 10254278, EP-A 895809, DE-A 10122027, JP-A 7-232071 and JP-A 11-169716).

The X-ray diffraction pattern XP forms the fingerprint of a specific crystal structure, of a specific crystal phase, which is defined as the i-phase in the prior art referred to above.

From the abovementioned publications, it is furthermore known that the i-phase is only one crystal phase in which such multimetal oxide materials can occur.

A second specific crystal structure in which such multimetal oxide materials can occur is defined as the k-phase in the prior art. According to the above-mentioned publications, its X-ray diffractogram has, inter alia, reflections representing the following interplanar spacings d [Å]:

| |
| --- |
| 4.02 ± 0.2, |
| 3.16 ± 0.2, |
| 2.48 ± 0.2, |
| 2.01 ± 0.2 and |
| 1.82 ± 0.1. | i-Phase and k-phase are similar to one another but differ in particular in that the X-ray diffractogram of the k-phase usually has no reflections for $d \geq 4.2$ Å. Usually, the k-phase also contains no reflections in the range 3.8 Å $\geq d \geq$ 3.35 Å. Furthermore, the k-phase contains, as a rule, no reflections in the range 2.95 Å $\geq d \geq$ 2.68 Å.

The abovementioned prior art also discloses that such multimetal oxide materials are suitable as active materials for catalysts for the heterogeneously catalyzed partial gas-phase oxidation and for the heterogeneously catalyzed partial gas-phase ammoxidation (differs from the pure partial gas-phase oxidation substantially through the additional presence of ammonia) of lower alkanes, alkenes, alcohols and aldehydes (having in particular 2, 3 and/or 4 carbon atoms). Partial oxidation products are, inter alia, $\alpha,\beta$-monoethylenically unsaturated aldehydes (e.g. acrolein and methacrolein) and $\alpha,\beta$-monoethylenically unsaturated carboxylic acids (e.g. acrylic acid and methacrylic acid) and the nitriles thereof (e.g. acrylonitrile and methacrylonitrile).

Furthermore, the abovementioned prior art discloses that the catalytic performance (activity, selectivity of the formation of the desired product) of the multimetal oxide materials having the i-phase structure is as a rule superior to that in another (e.g. k-phase) structure.

However, the abovementioned prior art also discloses that it is very difficult to produce, in the i-phase structure, multimetal oxides containing Mo and V and at least two elements selected from the group consisting of lanthanides, transition metals of the Periodic Table of the Elements and elements of the third to sixth main group of the Periodic Table of the Elements.

Thus, existing methods provide as a rule solid solution systems which have only a certain i-phase fraction (e.g. in addition to k-phase) and from which, for optimum catalyst performance, the i-phase fraction is isolated by washing out the other phases (e.g. the k-phase) with suitable liquids (e.g. WO 0206199, JP-A 7-232071 and DE-A 10254279).

Furthermore, the cited prior art discloses that significant i-phase fractions have been obtained to date by the known preparation methods only when the multimetal oxide also contains Nb and at least one of the two elements Te and Sb in addition to Mo and V.

It is an object of the present invention to provide multimetal oxides which contain Mo and V and, if required, one or more elements selected from the group consisting of lanthanides, transition elements of the Periodic Table of the Elements and elements of the third to sixth main group of the Periodic Table of the Elements and which are obtainable in a comparatively simple manner with an increased i-phase fraction or as pure i-phase.

We have found that this object is achieved starting from Ultramicroscopy 52 (1993), 429-435, which discloses the multimetal oxides $Cs_x(Nb,W)_5O_{14}$ which contain fractions in which Nb, W and O are arranged three-dimensionally in the i-phase structure and in which the Cs occupies tunnel-like cavities in the crystal structure of the i-phase.

Journal of Solid State of Chemistry 163 (2002), 210 to 217 discloses vanadium-molybdenum bronzes which contain K, Rb or Cs and have no i-phase fractions.

Journal of Solid State Chemistry 162 (2002), 341-346 discloses tungsten-molybdenum bronzes which contain K or Cs and likewise have no i-phase fractions.

U.S. Pat. No. 6,428,765 B1 discloses multimetal oxides which may contain the element combination Mo and V and alkali metal and/or $NH_4$, but the element combination Mo/V is not present in any of the working examples.

In contrast, the working examples of U.S. Pat. No. 6,171,571 B1 contain the element combination Mo/V, but only in combination with the alkali metal element Li, which has small atoms in comparison.

A presence of i-phase fractions is not evident in either of the two cases.

The potassium-containing tungsten-niobium bronzes disclosed in Chemica Scripta 28 (1988), 77 to 80 also have no i-phase fractions.

In view of this prior art, it is surprising that, as an achievement of the object according to the invention, it was found that multimetal oxides containing Mo and V and, if required, one or more of the elements from the group consisting of lanthanides, transition metals of the Periodic Table of the Elements and elements of the third to sixth main group of the Periodic Table of the Elements are obtainable with an increased probability of having significant i-phase fractions (or exclusively with the crystal structure of the i-phase) when they are produced in the presence of $NH_4$ or of alkali metal having a larger radius than Li.

Surprisingly, the above is also applicable when neither Nb nor Te nor Sb is present as an accompanying element in the multimetal oxide.

It is true that the generic formulae of EP-A 1 256 381, EP-A 1 254 708, EP-A 1 254 709, EP-A 1 254 707 and EP-A 1 254 706 do not rule out the presence of alkali metal, but alkali metal is not present in a single working example of these publications. Moreover, Li is regarded as an equivalent possible accompanying alkali metal in these publications.

Multimetal oxides of the formula I

$$A_a[Mo_{5-b-c}V_bX_cO_d]_1 \quad (I)$$

where
A is at least one of the elements from the group consisting of $NH_4$, Na, K, Rb, Cs and Tl;
X is one or more of the elements from the group consisting of La, Ce, Pr, Nd, Pm, Sm, Eu, Gd, Tb, Dy, Ho, Er, Tm, Yb, Lu, Ti, Zr, Hf, Nb, Ta, W, Mn, Re, Fe, Co, Ni, Cr, Ru, Rh, Pd, Os, Ir, Pt, Cu, Ag, Au, Zn, Cd, Hg, B, Al, Ga, In, C, Si, Ge, Sn, Pb, P, As, Sb, Bi, S, Se and Te;
a is from 0.1 to 1, preferably from 0.2 to 0.8, particularly preferably from 0.3 to 0.7, very particularly preferably from 0.4 to 0.6;
b is from 0.25 to 4.5; and
c is from 0 to 4.5,
with the proviso that b+c≦4.5,
whose X-ray diffractogram contains the following X-ray diffraction pattern XP, reproduced in the form of interplanar spacings d [Å] independent of the wavelength of the X-rays used,

| d [Å] |
|---|
| 3.06 ± 0.2 (preferably ± 0.1) |
| 3.17 ± 0.2 (preferably ± 0.1) |
| 3.28 ± 0.2 (preferably ± 0.1) |
| 3.99 ± 0.2 (preferably ± 0.1) |
| 9.82 ± 0.4 (preferably ± 0.2) |
| 11.24 ± 0.4 (preferably ± 0.2) |
| 13.28 ± 0.5 (preferably ± 0.3), | are therefore provided as an achievement of the object of this document.

Over and above said reflection positions, the X-ray diffraction pattern XP of the novel multimetal oxide materials additionally has in many cases (depending on the elements contained and on the crystallite geometry (e.g. acicular shape or lamellar shape)) characteristic reflection intensities.

Based on the intensity of the reflection representing the interplanar spacing d [Å]=3.99±0.2, these (relative) reflection intensities I (%) are as follows:

| d[Å] | I (%) |
|---|---|
| 3.06 ± 0.2 | 5 to 65 |
| 3.17 ± 0.2 | 5 to 65 |
| 3.28 ± 0.2 | 15 to 130, frequently 15 to 95 |
| 3.99 ± 0.2 | 100 |
| 9.82 ± 0.4 | 1 to 50, frequently 1 to 30 |
| 11.24 ± 0.4 | 1 to 45, frequently 1 to 30 |
| 13.28 ± 0.5 | 1 to 35, frequently 1 to 15. |

It is preferred according to the invention if A is at least one of the elements from the group consisting of K, Rb and Cs. Particularly preferably, A is Rb and/or Cs and very particularly preferably A is Cs.

X is preferably one or more elements from the group consisting of Ti, Zr, Ta, Cr, W, Mn, Re, Fe, Co, Ni, Pd, Pt, Cu, Ag, Au, Zn, Al, Ga, In, Ge, Sn, Pb, P, Sb, Bi, Se and Te.

Particularly preferably, X is one or more elements from the group consisting of Ti, Cr, W, Mn, Re, Fe, Co, Ni, Pd, Pt, Cu, Ag, Ga, Sn, Sb and Te.

The stoichiometric coefficient c is preferably >0, particularly preferably from 0.05 to 4.5, very particularly preferably from 0.05 to 4.0.

The stoichiometric coefficient b is advantageously from 0.5 to 2.5.

Moreover, it is generally advantageous for the novel multimetal oxides if
a is from 0.2 to 0.8, preferably from 0.3 to 0.7, particularly preferably from 0.4 to 0.6. The experimental determination of the oxygen content can be effected, for example, by means of an Oxygen Determinator from LECO Corporation (USA) (e.g. by means of a TC-436 from LECO).

Furthermore, it is advantageous for the novel multimetal oxides if more than 25, particularly preferably more than 50, very particularly preferably more than 75, mol % or 100 mol % of the V contained therein is present in the oxidation state +4. The experimental checking of the oxidation state of V can be effected titrimetrically, as described in EP-A 774297.

In addition to the abovementioned, particularly characteristic reflections, the following reflections, likewise reproduced in the form of interplanar spacings d [Å] independent of the wavelength of the X-rays used, are often also detectable in the X-ray diffraction pattern representing the i-phase for the novel multimetal oxides:

| d [Å] |
|---|
| 8.19 ± 0.3 (preferably ± 0.15) |
| 3.51 ± 0.2 (preferably ± 0.1) |
| 3.42 ± 0.2 (preferably ± 0.1) |
| 3.34 ± 0.2 (preferably ± 0.1) |
| 2.94 ± 0.2 (preferably ± 0.1) |
| 2.86 ± 0.2 (preferably ± 0.1) |

Based on the intensity of the reflection representing the interplanar spacing d [Å]=3.99±0.2, the (relative) intensities I (%) of the above reflections are frequently as follows:

| d [Å] | I (%) |
|---|---|
| 8.19 ± 0.3 (or ± 0.15) | 0 to 25 |
| 3.51 ± 0.2 (or ± 0.1) | 2 to 50 |
| 3.42 ± 0.2 (or ± 0.1) | 5 to 75 |
| 3.34 ± 0.2 (or ± 0.1) | 5 to 80 |
| 2.94 ± 0.2 (or ± 0.1) | 5 to 55 |
| 2.86 ± 0.2 (or ± 0.1) | 5 to 60. |

Often, the X-ray diffraction pattern representing the i-phase is also supplemented by the following reflections:

| d [Å] |
|---|
| 2.54 ± 0.2 (preferably ± 0.1) |
| 2.01 ± 0.2 (preferably ± 0.1) |

The (relative) reflection intensities on the same basis as above are often as follows in the case of these reflections:

| d [Å] | I (%) |
|---|---|
| 2.54 ± 0.2 (or ± 0.1) | 0.5 to 40 |
| 2.01 ± 0.2 (or ± 0.1) | 5 to 60. |

Novel multimetal oxides in whose X-ray diffractogram the reflection representing the interplanar spacing d [Å]=3.99±0.2 (or ±0.1) or the reflection representing the interplanar spacing d [Å]=3.28±0.2 (or ±0.1) is the most intense reflection (having the strongest intensity) are preferred according to the invention.

Furthermore, those multimetal oxides in which the 2θ full width at half height of the reflection d [Å]=3.99±0.2 (or ±0.1) is ≦1°, preferably ≦0.5°, are preferred. The 2θ full width at half height of the other reflections mentioned is usually ≦3°, preferably ≦1.5°, particularly preferably ≦1°.

All data in this document which are based on an X-ray diffractogram relate to an X-ray diffractogram produced using CuKα radiation (λ=1.54178 Å) (Siemens diffractometer Theta-Theta D-5000, tube voltage: 40 kV, tube current: 40 mA, aperture V20 (variable), collimator V20 (variable), secondary monochromator aperture (0.1 mm), detector aperture (0.6 mm), measuring interval (2θ): 0.02°, measuring time per step: 2.4 s, detector: scintillation counter; the definition of the intensity of a reflection in the X-ray diffractogram in this document is based on the definition stated in DE-A 19835247, DE-A 10122027, DE-A 10051419 and DE-A 10046672; the same applies to the definition of the 2θ full width at half height).

The wavelength λ of the X-rays used for the diffraction and the diffraction angle θ (in this document, the peak of a reflection in the 2θ plot is used as the reflection position) are related to one another by the Bragg relationship, as follows:

$$2 \sin \theta = \lambda / d,$$

where d is that interplanar spacing of the three-dimensional atomic arrangement which belongs to the respective reflection.

The novel multimetal oxide materials are prepared, as a rule, by producing a very intimate, preferably finely divided, dry blend (of the desired stoichiometry with respect to the constituents) from suitable sources of the elemental constituents of the multimetal oxide material and subjecting said dry blend to a thermal treatment at from 350 to 1000° C. or from 400 to 700° C. or from 400 to 650° C. or from 400 to 600° C.

The thermal treatment can be effected in principle under an oxidizing, reducing or inert atmosphere. A suitable oxidizing atmosphere is, for example, air, air enriched with molecular oxygen or air depleted in oxygen. Preferably, however, the thermal treatment is carried out under an inert atmosphere, for example under molecular nitrogen and/or a noble gas. Usually, the thermal treatment is effected at atmospheric pressure (1 atm). Of course, the thermal treatment can also be effected under reduced or superatmospheric pressure.

If the thermal treatment is effected under a gaseous atmosphere, this may be either stationary or flowing. It preferably flows. In general, the thermal treatment may take up to 24 hours or more.

Preferably, the thermal treatment is effected first under an oxidizing (oxygen-containing) atmosphere (e.g. under air) at from 150 to 400° C. or from 250 to 350° C. (=preliminary decomposition step). Thereafter, the thermal treatment is expediently continued under inert gas at from 350 to 1000° C. or from 400 to 700° C. or from 400 to 650° C. or from 400 to 600° C.

The thorough mixing of the starting compounds can be effected in dry or in wet form.

If it is effected in dry form, the starting compounds are expediently used in the form of finely divided powders and, after the mixing and, if required, compaction, are subjected to the calcination (thermal treatment).

Preferably, however, the thorough mixing is effected in wet form. Here, the starting compounds are usually mixed with one another in the form of an aqueous solution (if required in the presence of complexing agents; cf. for example DE-A 10145958) and/or suspension. The aqueous material is then dried and, after drying, is calcined. Expediently, the aqueous material is an aqueous solution or an aqueous suspension. The drying process is preferably effected immediately after the preparation of the aqueous mixture (particularly in the case of an aqueous solution; cf. for example JP-A 7-315842) and by spray-drying (the outlet temperatures are as a rule from 100 to 150° C.; the spray-drying can be carried out by the cocurrent or countercurrent method), which requires a particularly intimate dry blend, especially when the aqueous material which can be spray-dried is an aqueous solution or suspension. However, drying can also be effected by evaporating down under reduced pressure, by freeze-spraying, by freeze-drying or by conventional evaporation.

A preparation of the novel multimetal oxides by a hydrothermal route, described, for example, in DE-A 10029338 and JP-A 2000-143244, is also advantageous.

Suitable sources of the elemental constituents when carrying out the above-described methods for the preparation of novel multimetal oxide materials are all those which are capable of forming oxides and/or hydroxides on heating (if required in air). Of course, oxides and/or hydroxides of the elemental constituents may also be concomitantly used or exclusively used as such starting compounds, i.e. all starting compounds mentioned in the publications of the prior art evaluated are particularly suitable.

Sources of the element Mo which are suitable according to the invention are, for example, molybdenum oxides, such as molybdenum trioxide, molybdates, such as ammonium heptamolybdate tetrahydrate, and molybdenum halides, such as molybdenum chloride.

Suitable starting compounds for the element V which are to be concomitantly used according to the invention are, for example, vanadium oxysulfate hydrate, vanadyl acetylacetonate, vanadates, such as ammonium metavanadate, vanadium oxides, such as vanadium pentoxide ($V_2O_5$), vanadium halides, such as vanadium tetrachloride ($VCl_4$), and vanadium oxyhalides, such as $VOCl_3$. Vanadium starting compounds which may also be present are those which contain vanadium in the oxidation state +4.

It is advantageous according to the invention to use, as sources of the element V, mixtures of compounds, which contain the element V in the oxidation state +5, and elemental vanadium. The average V oxidation state +4, which is preferred according to the invention, can then form from this mixture, at the latest during the calcination.

If compounds which contain V in the oxidation state +5 are exclusively used as sources of V, it is advantageous according to the invention concomitantly to use starting compounds which contain reducing agents other than elemental vanadium (e.g. $NH_4^+$ or the decomposition product thereof $NH_3$) and which are capable of reducing $V^{5+}$ to $V^{4+}$. Such a reducing agent can also be oxalic acid, oxalate (e.g. as niobium oxalate), hydrazine dihydrochloride, hydrazine sulfate, hydrazine (monohydrate), hydroxylamine, hydroxylamine hydrochloride or salts thereof. The preparation of the intimate dry blend is preferably effected under an inert gas atmosphere (e.g. $N_2$) in order to ensure better control of the oxidation states.

According to the invention, suitable sources of the element tellurium are tellurium oxides, such as tellurium dioxide, metallic tellurium, tellurium halides, such as $TeCl_2$, as well as telluric acids, e.g. orthotelluric acid $H_6TeO_6$. Of course, elemental tellurium or other constituents in elemental form (e.g. antimony, iron, samarium, zinc, aluminum, arsenic) may also be present as reducing agents (e.g. for $V^{5+}$).

Further advantageous antimony starting compounds are antimony halides, such as $SbCl_3$, antimony oxides, such as antimony trioxide ($Sb_2O_3$), antimonic acids, such as $HSb(OH)_6$, as well as antimony oxide salts, such as antimony oxide sulfate $(SbO)_2SO_4$.

Niobium sources suitable according to the invention are, for example, niobium oxides, such as niobium pentoxide ($Nb_2O_5$), niobium oxyhalides, such as $NbOCl_3$, niobium halides, such as $NbCl_5$, as well as complex compounds of niobium and organic carboxylic acids and/or dicarboxylic acids, e.g. oxalates and alcoholates. Of course, the Nb-containing solutions used in EP-A 895 809 are also suitable as a niobium source.

Regarding all other possible elements (in particular Fe, Pb, Ni, Cu, Co, Bi and Pd and the alkali metal elements), suitable starting compounds are in particular halides, nitrates, formates, oxalates, acetates, bicarbonates, carbonates and/or hydroxides thereof. Suitable starting compounds are also often oxo compounds thereof, e.g. tungstates or the acids derived therefrom. Ammonium salts are also frequently used as starting compounds.

Furthermore, polyanions of the Anderson type, as described, for example, in Polyhedron Vol. 6, No. 2 (1987) 213-218, are also suitable for use as starting compounds. A further suitable literature source for polyanions of the Anderson type is Kinetics and Catalysis, Vol. 40, No. 3 (1999) 401 to 404.

Other polyanions suitable as starting compounds are, for example, those of the Dawson or Keggin type. Those starting compounds which are converted into their oxides at elevated temperatures, either in the presence or in the absence of oxygen, possibly with liberation of gaseous compounds, are preferably used.

Also applicable to the novel multimetal oxide materials are of course the teachings of JP-A 8-57319 and EP-A 1254707, according to which the catalytic performance (activity and selectivity of the formation of the desired product) of Mo- and V-containing multimetal oxide materials can be improved by treatment with suitable liquids, e.g. acids.

Suitable liquids of this type are, for example, organic acids and inorganic acids and aqueous solutions thereof (e.g. oxalic acid, formic acid, acetic acid, citric acid, tartaric acid, nitric acid, sulfuric acid, perchloric acid, hydrochloric acid, telluric acid, boric acid and mixtures thereof and aqueous solutions), as well as alcohols, alcoholic solutions of the abovementioned acids and aqueous hydrogen peroxide solutions.

In the case of phase heterogeneity of the novel multimetal oxides, it is noteworthy that such washing increases the i-phase fraction thereof (other phases, e.g. k-phase, are preferentially removed by dissolution).

Furthermore, such washing generally reduces the content of the elements A in the novel multimetal oxide materials relative to their content of M, without adversely affecting the i-phase formed in the multimetal oxide materials.

A subsequent reduction in the content of the elements A relative to the content of Mo in the novel multimetal oxide materials is also possible by extracting them with liquids which are capable of preferentially absorbing elements A. Such liquids are, for example, liquids which contain complexing agents (e.g. crown ethers) for elements A. Of course, however, solutions of inorganic salts or melts of these salts or ionic liquids may also be used as such liquids.

The abovementioned treatment of novel multimetal oxides with suitable liquids or salt melts can be effected at from 20 to 600° C. or 400° C., or from 40 to 380° C. or from 45 to 100° C. and is of interest, inter alia, in the case of multimetal oxides which contain a) no Nb or
b) no Te or
c) no Sb or
d) no Nb and no Te or
e) no Nb and no Sb.

Usually, the treatment is effected at atmospheric pressure and takes from a few hours to a few days. The treatment with solutions is preferably carried out under reflux. Finally, washing with water is usually effected.

It is advantageous according to the invention if the fraction of the element A is subsequently removed from the novel multimetal oxides to such an extent that the ratio [5-b-c]/a increases by at least 5%, preferably by at least 25%, particularly preferably by at least 50%, very particularly preferably by at least 75% (based on the starting value; frequently, the ratio [5-b-c]/a will increase by not more than 200% or by not more than 100%). The elements A can subsequently also be completely removed from the novel multimetal oxide materials as described without significant structural changes taking place thereby. Frequently, for reasons of cost-efficiency, complete removal of the elements A is not carried out.

The novel multimetal oxides can be used as such (materials 1) or after partial or complete removal of the elements A contained in them (materials 2) or after impregnation of the materials 1 or of the materials 2 with solutions of promoter element compounds (e.g. aqueous solutions), drying and further thermal treatment (preferably in an inert gas stream and preferably without preliminary decomposition in air) as active material for catalysts. Impregnation with solutions of salts of the elements Pb, Ni, Co, Bi, Pd, Ag, Pt, Cu, Au, Ga, Zn, Sn, In, Re, Ir, Sm, Sc, Y, Pr, Nd and Tb is advantageous, the latter especially when the multimetal oxide to be impregnated does not yet contain these elements. For such impregnation, it is preferable to use the aqueous nitrate and/or halide solutions of these elements or aqueous solutions in which these elements are present in complexed form with organic compounds (e.g. acetates or acetylacetonates).

The use as active material for catalysts can be effected in powder form or after shaping to give moldings. The catalyst bed may be a fixed bed, a moving bed or a fluidized bed.

The shaping to give moldings can be effected, for example, by application to a support, as described in DE-A 10118814 or PCT/EP/02/04073 or DE-A 10051419.

The supports to be used for this purpose are preferably chemically inert, i.e. they substantially do not participate in the course of the partial catalytic gas-phase oxidation or ammoxidation which is catalyzed by the active materials.

According to the invention, suitable materials for the supports are in particular alumina, silica, silicates, such as clay, kaolin, steatite (preferably having a low water-soluble alkali content), pumice, aluminum silicate and magnesium silicate, such as silicon carbide, zirconium dioxide and thorium dioxide.

simple manner with the liquid binder and a coat of the active material is attached to the moistened surface by bringing into contact with finely divided active material. The coated support is then dried. Of course, the process can be periodically repeated in order to achieve a greater coat thickness. In this case, the coated body becomes the new support, etc.

The fineness of the catalytically active oxide material to be applied to the surface of the support is of course adapted to the desired coat thickness. For example, those active material powders in which at least 50% of the total number of powder particles pass through a sieve having a mesh size of from 1 to 20 µm and whose numeral proportion of particles having a longest dimension above 50 µm is less than 10% are suitable for the coat thickness range from 100 to 500 µm. As a result of the preparation, the distribution of the longest dimensions of the powder particles generally corresponds to a Gaussian distribution. Frequently, the particle size distribution is as follows:

| | D (µm) | | | | | | | | | | | | | |
|---|---|---|---|---|---|---|---|---|---|---|---|---|---|---|
| | 1 | 1.5 | 2 | 3 | 4 | 6 | 8 | 12 | 16 | 24 | 32 | 48 | 64 | 96 | 128 |
| x | 80.5 | 76.3 | 67.1 | 53.4 | 41.6 | 31.7 | 23 | 13.1 | 10.8 | 7.7 | 4 | 2.1 | 2 | 0 | 0 |
| y | 19.5 | 23.7 | 32.9 | 46.6 | 58.4 | 68.3 | 77 | 86.9 | 89.2 | 92.3 | 96 | 97.9 | 98 | 100 | 100 |

The surface of the support may be either smooth or rough. Advantageously, the surface of the support is rough since greater surface roughness generally results in a higher adhesive strength of the applied coat of active material.

Frequently, the surface roughness Rz of the support is from 5 to 200 µm, often from 20 to 100 µm (determined according to DIN 4768, Sheet 1, using a Hommel Tester for DIN-ISO measured surface variables from Hommelwerke, Germany).

Furthermore, the support material may be porous or nonporous. Expediently, the support material is nonporous (total volume of the pores relative to the volume of the support ≦1% by volume).

The thickness of the coat of active oxide material present on the novel coated catalysts is usually from 10 to 1000 µm. However, it may also be from 50 to 700 µm, from 100 to 600 µm or from 150 to 400 µm. Possible coat thicknesses are also from 10 to 500 µm, from 100 to 500 µm or from 150 to 300 µm.

In principle, any desired geometries of the supports are suitable for the novel process. Their longest dimension is as a rule from 1 to 10 mm. However, spheres or cylinders, in particular hollow cylinders, are preferably used as supports. Advantageous diameters for spherical supports are from 1.5 to 4 mm. If cylinders are used as supports, their length is preferably from 2 to 10 mm and their external diameter is preferably from 4 to 10 mm. In the case of rings, the wall thickness is moreover usually from 1 to 4 mm. Annular supports suitable according to the invention may also have a length of from 3 to 6 mm, an external diameter of from 4 to 8 mm and a wall thickness of from 1 to 2 mm. However, other possible geometries for annular supports are 7 mm×3 mm×4 mm or 5 mm×3 mm×2 mm (external diameter×length×internal diameter).

The preparation of said coated catalysts can be effected in a very simple manner by preforming the active material, converting it into a finely divided form and finally applying it to the surface of the support with the aid of a liquid binder. For this purpose, the surface of the support is moistened in a very Here:

D is the diameter of the particle, x is the percentage of the particles whose diameter is ≧D and y is the percentage of the particles whose diameter is <D.

For carrying out the coating process described on an industrial scale, the use of the principle disclosed in DE-A 2909671 and of that disclosed in DE-A 10051419, for example, is advisable, i.e. the supports to be coated are initially taken in a preferably inclined (the angle of inclination is as a rule ≧0° and ≦90°, in general ≧30° and ≦90°; the angle of inclination is the angle between the central axis of the rotating container and the horizontal) rotating container (e.g. rotating pan or rotating drum). The rotating container transports the supports, for example spherical or cylindrical ones, under two metering apparatuses arranged in succession a certain distance apart. The first of the two metering apparatuses expediently corresponds to a nozzle (for example an atomizer nozzle operated with compressed air), through which the supports rolling in the rotating pan are sprayed with the liquid binder and are moistened in a controlled manner. The second metering apparatus is present outside the atomization cone of the liquid binder sprayed in and serves for feeding in the finely divided oxidic active material (for example via a shaking conveyor or a powder screw). The spherical supports moistened in a controlled manner absorb the active material powder fed in, which is compacted by the rolling movement on the outer surface of the support, for example cylindrical or spherical support, to give a cohesive coat.

If required, the support provided with a base coat in this manner passes again through the spray nozzles in the course of the subsequent revolution and is moistened in a controlled manner thereby in order to be able to absorb a further coat of Jinely divided oxidic active material in the course of the further movement, etc. (intermediate drying is as a rule not necessary). Finely divided oxidic active material and liquid binder are as a rule fed in continuously and simultaneously.

The removal of the liquid binder can be effected after the end of coating, for example by the action of hot gases, such as N₂ or air. It is noteworthy that the coating process described results in both completely satisfactory adhesion of the successive coats to one another and of the base coat to the surface of the support.

What is important for the coating method described above is that the moistening of the support surface to be coated is carried out in a controlled manner. In short, this means that the support surface is expediently moistened so that it contains adsorbed liquid binder but no liquid phase as such is visible on the support surface. If the support surface is too moist, the finely divided catalytically active oxide material agglomerates to form separate agglomerates instead of being adsorbed onto the surface. Detailed information in this context is to be found in DE-A 2909671 and in DE-A 10051419.

The abovementioned final removal of the liquid binder used can be carried out in a controlled manner, for example by evaporation and/or sublimation. In the simplest case, this can be effected by the action of hot gases of appropriate temperature (frequently from 50 to 300° C., often 150° C.). However, only preliminary drying can be effected by the action of hot gases. Final drying can then be effected, for example, in a drying oven of any desired type (for example a belt dryer) or in a reactor. The effective temperature should not be above the maximum calcination temperature used for the preparation of the oxidic active material. Of course, the drying can also be carried out exclusively in a drying oven.

Regardless of the type and geometry of the support, the following can be used as a binder for the coating process: water, monohydric alcohols, such as ethanol, methanol, propanol and butanol, polyhydric alcohols, such as ethylene glycol, 1,4-butanediol, 1,6-hexanediol or glycerol, monobasic or polybasic organic carboxylic acids, such as propionic acid, oxalic acid, malonic acid, glutaric acid or maleic acid, amino alcohols, such as ethanolamine or diethanolamine, and monofunctional or polyfunctional organic amides, such as formamide. Other advantageous binders are solutions consisting of from 20 to 90% by weight of water and from 10 to 80% by weight of an organic compound which is dissolved in water and whose boiling point or sublimation temperature at atmospheric pressure (1 atm) is >100° C., preferably >150° C. Advantageously, the organic compound is selected from the above list of possible organic binders. The organic fraction of abovementioned aqueous binder solutions is preferably from 10 to 50, particularly preferably from 20 to 30, % by weight. Suitable organic components are also monosaccharides and oligosaccharides, such as glucose, fructose, sucrose or lactose, and polyethylene oxides and polyacrylates.

The fact that the preparation of the coated catalysts can be effected not only by application of the prepared, finely milled active oxide materials to the moistened support surface is important.

Rather, instead of the active oxide materials, a finely divided precursor material thereof can also be applied to the moistened support surface (using the same coating process and binder) and the calcination can be carried out after drying of the coated support (it is also possible for supports to be impregnated with a precursor solution, subsequently dried and then calcined). Finally, the phases other than the i-phase and/or the elements A can, if required, be washed out.

A suitable finely divided precursor material of this type is, for example, the material which is obtainable by first producing a very intimate, preferably finely divided dry blend from the sources of the elemental constituents of the desired active oxide material (for example by spray-drying an aqueous suspension or solution of the sources) and subjecting this finely divided dry blend, at from 150 to 350° C., preferably from 250 to 350° C., under an oxidizing (oxygen-containing) atmosphere (e.g. under air), to a thermal treatment (for a few hours) and finally, if required, to milling.

After the coating of the supports with the precursor material, calcination is then effected, preferably under an inert gas atmosphere (all other atmospheres are also suitable) at from 350 to 1000° C. or from 400 to 700° C. or from 400 to 650° C. or from 400 to 600° C.

Of course, the shaping of the active materials can also be effected by extrusion and/or tableting of both finely divided active material and finely divided precursor material (if necessary, the washing out of the phases other than the i-phase and/or of the elements can be carried out finally).

Suitable geometries for the unsupported catalysts obtained are spheres, solid cylinders and hollow cylinders (rings). The longest dimension of the abovementioned geometries is as a rule from 1 to 10 mm. In the case of cylinders, their length is preferably from 2 to 10 mm and their external diameter preferably from 4 to 10 mm. In the case of rings, the wall thickness is moreover usually from 1 to 4 mm. Annular unsupported catalysts suitable according to the invention may also have a length of from 3 to 6 mm, an external diameter of from 4 to 8 mm and a wall thickness of from 1 to 2 mm. However, an unsupported annular catalyst may also have a geometry of 7 mm×3 mm×4 mm or of 5 mm×3 mm×2 mm (external diameter×length×internal diameter).

Of course, the geometries of DE-A 10101695 are also suitable.

The active materials can of course be used as catalytically active materials also in a form diluted with finely divided, for example colloidal, materials, such as silica, titanium dioxide, alumina, zirconium oxide or niobium oxide. The diluents can be incorporated into the active material or into one of its precursor materials.

The active materials described in this document are suitable (in powder form or after shaping to give geometrical moldings, undiluted or diluted) as active materials for heterogeneously catalyzed partial gas-phase oxidations (including oxydehydrogenations) and/or ammoxidations of saturated and/or unsaturated hydrocarbons and of saturated and/or unsaturated aldehydes.

Such saturated and/or unsaturated hydrocarbons are in particular ethane, ethylene, propane, propylene, n-butane, isobutane and isobutene. Target products are in particular acetic acid, vinyl acetate, acrolein, acrylic acid, methacrolein, methacrylic acid, acrylonitrile and methacrylonitrile. However, they are also suitable for the heterogeneously catalyzed partial gas-phase oxidation and/or ammoxidation of compounds such as acrolein and methacrolein.

However, ethylene, propylene, n-butene and isobutene may also be desired products.

In this document, a complete oxidation of a hydrocarbon is understood as meaning that all of the carbon contained in the hydrocarbon is converted into oxides of carbon (CO, CO₂).

All those reactions of carbon under the reactive action of molecular oxygen which differ therefrom are subsumed in this document under the term partial oxidation. The additional reactive action of ammonia is referred to as partial ammoxidation.

The active materials stated in this document are preferably suitable as catalytically active materials for the conversion of n-butane to maleic anhydride, of propane to acrolein and/or acrylic acid, of propane to acrylic acid and/or acrylonitrile, of propylene to acrolein and/or acrylic acid, of propylene to acrylonitrile, of isobutane to methacrolein and/or methacrylic acid, of isobutane to methacrylic acid and/or methacrylonitrile, of isobutene to methacrolein and/or methacrylic acid, of isobutene to methacrylic acid and/or methacrylonitrile, of ethane to ethylene, of ethane to acetic acid and/or vinyl acetate and of ethylene to acetic acid and/or vinyl acetate.

The procedure for such partial oxidations and/or ammoxidations (by choosing the ammonia content of the reaction gas mixture with control in a manner known per se, the reaction can be designed exclusively as a partial oxidation or exclusively as a partial ammoxidation or as a superposition of the two reactions; cf. for example WO 98/22421) is known per se from the i-/k-phase-containing multimetal oxide materials of the cited prior art and can be implemented in a completely corresponding manner.

It is also possible to employ the process described in DE-A 10254279.

If the hydrocarbon used is crude propane or crude propylene, this preferably has the composition described in DE-A 10246119 or DE-A 10118814 or PCT/EP/02/04073. It is likewise preferred to proceed as described therein.

A partial oxidation of propane to acrylic acid can be carried out as described, for example, in EP-A 608838, WO 0029106, JP-A 10-36311 and EP-A 1192987.

For example, air, air enriched with oxygen or air depleted in oxygen or pure oxygen can be used as a source for the required molecular oxygen.

Such a process is also advantageous when the reaction gas starting mixture does not contain a proportion of noble gas over and above the noble gas content of air, in particular no helium, as inert diluent gas. Moreover, the reaction gas starting mixture can of course comprise inert diluent gases such as $N_2$, CO and $CO_2$ in addition to propane and molecular oxygen. Steam as a component of the reaction gas mixture is advantageous according to the invention.

This means that the reaction gas starting mixture with which the novel active material is to be loaded at reaction temperatures of, for example, from 200 to 550° C. or from 230 to 480° C. or from 300 to 440° C. and pressures of from 1 to 10 bar or from 2 to 5 bar may have, for example, the following composition:

from 1 to 15, preferably from 1 to 7, % by volume of propane, from 44 to 99% by volume of air and from 0 to 55% by volume of steam.

Steam-containing reaction gas starting mixtures are preferred.

Other possible compositions of the reaction gas starting mixture are:

from 70 to 95% by volume of propane, from 5 to 30% by volume of molecular oxygen and from 0 to 25% by volume of steam.

Of course, such a process gives a product gas mixture which does not consist exclusively of acrylic acid. Rather, in addition to unconverted propane, the product gas mixture contains secondary components, such as propene, acrolein, $CO_2$, CO, $H_2O$, acetic acid, propionic acid, etc., from which the acrylic acid has to be separated off.

This can be effected in the manner known from the heterogeneously catalyzed gas-phase oxidation of propene to acrylic acid.

The novel multimetal oxide materials can, however, also be integrated in other multimetal oxide materials (for example, their finely divided materials can be mixed, if necessary compressed and calcined, or can be mixed in the form of slurries (preferably aqueous ones), dried and calcined (for example similarly to the manner described in EP-A 529853 for the multimetal oxide materials there)). Once again, calcination is preferably effected under inert gas.

EXAMPLES AND COMPARATIVE EXAMPLES

Comparative Example 1

$[Mo_{3.8}V^{4+}_{1.2}O_{13.8}]$ 115.5 g of ammonium metavanadate from H.C. Starck ($V_2O_5$ content=75.6% by weight; 0.96 mol of $V^{5+}$) were dissolved at 80° C. in 6000 ml of water while flushing with nitrogen and stirring to give a clear yellowish solution. 671.1 g of ammonium heptamolybdate tetrahydrate from H.C. Starck ($MoO_3$ content=81.5% by weight; 3.8 mol of Mo) were then dissolved in this solution with stirring and while maintaining the 80° C. and the flushing with nitrogen. 12.23 g of elemental V powder from ChemPur in 76204 Karlsruhe (100% V; 0.24 mol of $V^{\pm 0}$) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. The aqueous suspension was then spray-dried in a spray dryer from Niro (spray dryer Niro A/S Atomizer, Transportable Minor unit, centrifugal atomizer from Niro, Denmark). The temperature of the initially taken material was 60° C. The gas inlet temperature $T^{in}$ was 370° C. and the gas outlet temperature $T^{OUT}$ was 105° C.

100 g of the spray-dried powder obtained were heated from 25° C. to 275° C. with a linear ramp in the course of 50 minutes in a rotary bulb furnace according to FIG. 1 of DE-A 10122027 (1 l internal volume) under an air stream of 50 l(S.T.P.)/h and then kept at 275° C. for 30 minutes while maintaining the air stream. The air stream was then replaced by 50 l(S.T.P.)/h nitrogen stream and heating was effected linearly from 275° C. to 575° C. in the course of 16 minutes and this temperature was maintained for 360 minutes while maintaining the nitrogen stream. Cooling to 25° C. was then effected while maintaining the nitrogen stream. The associated X-ray diffractogram is shown in FIG. 1. It has no i-phase fraction at all.

Example 1

$Cs_{0.5}[Mo_{3.8}V^{4+}_{1.2}O_{14.05}]_1$

Figure 2:
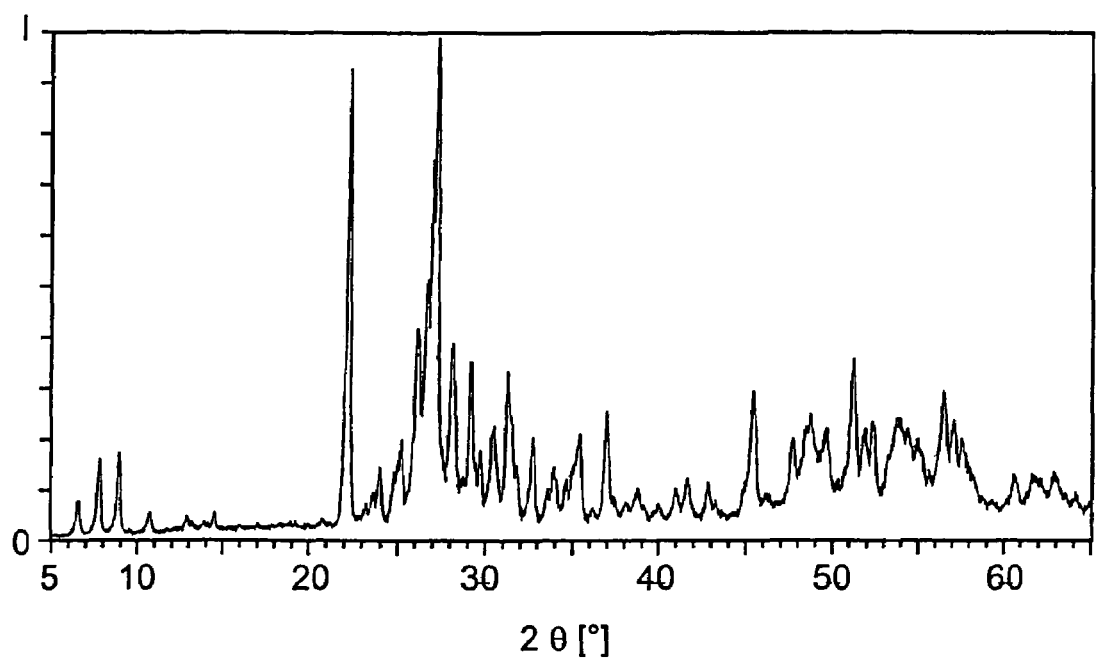

The preparation was carried out as in comparative example 1. After the stirring of the dark blue-black aqueous suspension for 12 hours at 60° C. was complete, however, 81.5 g of $Cs_2CO_3$ from ChemPur in 76204 Karlsruhe (100%; 0.5 mol of Cs) were added while maintaining the 60° C. and stirring was then effected for a further hour at 60° C. (all while flushing with nitrogen). Thereafter, spray-drying and thermal treatment were carried out as in comparative example 1. The associated X-ray diffractogram of the resulting active material is shown in FIG. 2. It comprises virtually pure i-phase. The relative intensities and positions of the reflections of the i-phase contained are as follows:

| d [Å] | I [%] |
|---|---|
| 13.33 | 8 |
| 11.29 | 18 |
| 9.86 | 19 |
| 8.20 | 6 |

-continued

| d [Å] | I [%] |
|---|---|
| 3.998 | 100 |
| 3.527 | 22 |
| 3.412 | 45 |
| 3.345 | 56 |
| 3.282 | 104 |
| 3.170 | 43 |
| 3.062 | 38 |
| 2.939 | 24 |
| 2.861 | 35 |

Comparative Example 2

$[Mo_{3.5}V^{4+}{}_1W_{0.5}O_{14}]$ 115.5 g of ammonium metavanadate from H.C. Starck ($V_2O_5$ content=75.6% by weight; 0.96 mol of $V^{5+}$) were dissolved at 80° C. in 6000 ml of water while flushing with nitrogen and stirring to give a clear yellowish solution. 741.8 g of ammonium heptamolybdate tetrahydrate from H.C. Starck ($MoO_3$ content=81.5% by weight; 4.2 mol of Mo) were then dissolved in this solution with stirring and while maintaining the 80° C. and the flushing with nitrogen. 12.23 g of elemental V powder from ChemPur in 76204 Karlsruhe (100% V; 0.24 mol of $V^{\pm 0}$) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. Thereafter, 156.5 g of ammonium paratungstate heptahydrate from H.C. Starck ($WO_3$ content=88.90% by weight; 0.6 mol of W) were added while continuing the flushing with nitrogen and the 60° C., and stirring was effected for 1 hour.

Figure 3:
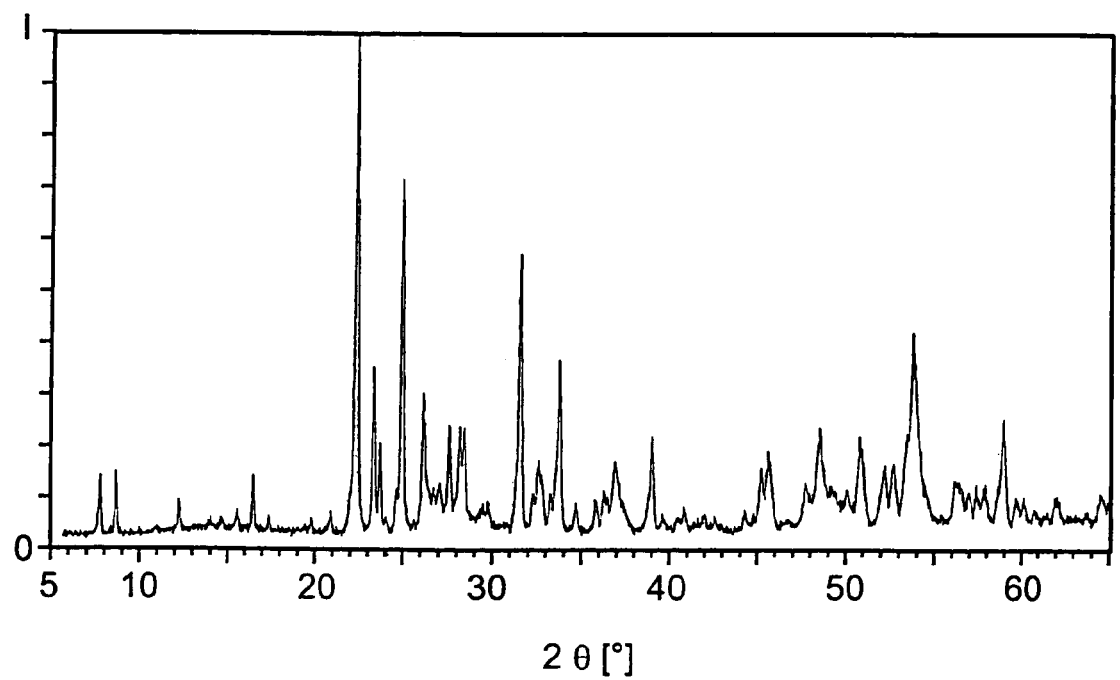

The aqueous suspension obtained was spray-dried as in comparative example 1, and 100 g of the spray-dried powder obtained were heated from 25° C. to 275° C. with a linear ramp in the course of 50 minutes in a rotary bulb furnace according to FIG. 1 of DE-A 10122027 (1 l internal volume) under an air stream of 50 l(S.T.P.)/h and then kept at 275° C. for 30 minutes while maintaining the air stream. Thereafter, the air stream was replaced by a 50 l(S.T.P.)/h nitrogen stream and heating was effected from 275° C. to 600° C. in the course of 15 minutes and this temperature was maintained for 360 minutes while maintaining the nitrogen stream. Cooling to 25° C. was then effected while maintaining the nitrogen stream. The associated X-ray diffractogram is shown in FIG. 3. It has no i-phase fraction at all.

Example 2

Figure 4:
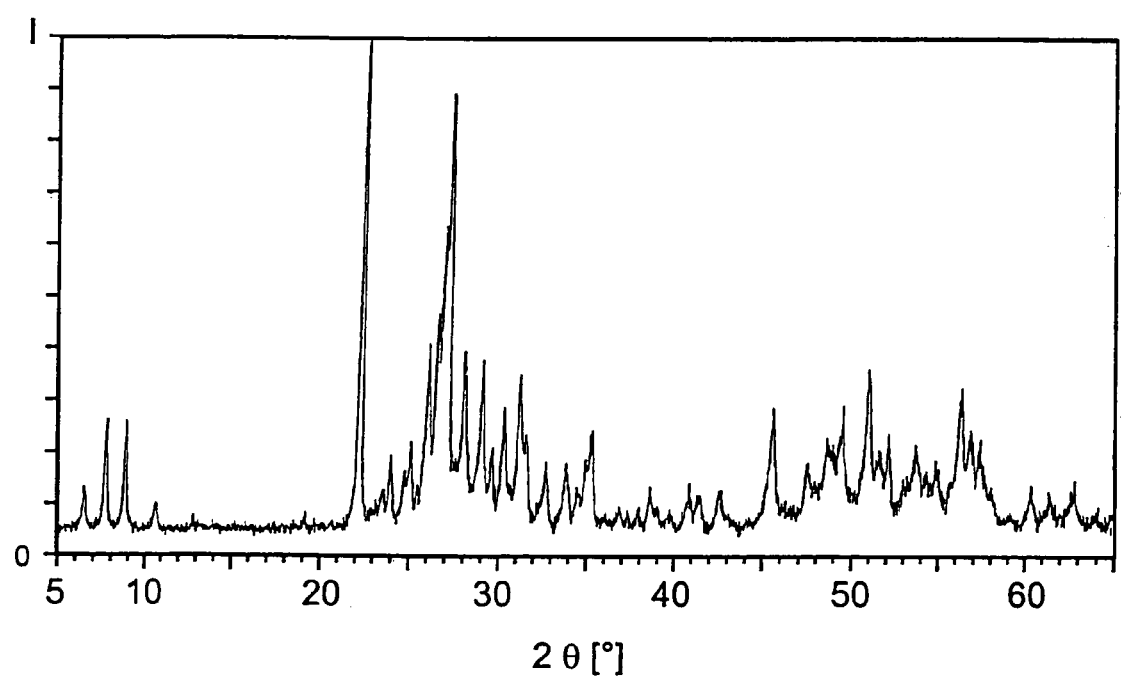

$Cs_{0.5}[Mo_{3.4}V^{4+}{}_{1.2}W_{0.4}O_{14}]_1$ 115.5 g of ammonium metavanadate from H.C. Starck ($V_2O_5$ content=75.6% by weight; 0.96 mol of $V^{5+}$) were dissolved at 80° C. in 6000 ml of water while flushing with nitrogen and stirring to give a clear yellowish solution. 600.5 g of ammonium heptamolybdate tetrahydrate from H.C. Starck ($MoO_3$ content=81.5% by weight; 3.4 mol of Mo) were then dissolved in this solution with stirring and while maintaining the 80° C. and the flushing with nitrogen. 12.23 g of elemental V powder from ChemPur in 76204 Karlsruhe (100% V; 0.24 mol of $V^{\pm 0}$) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. Thereafter, 104.3 g of ammonium paratungstate heptahydrate from. Starck ($WO_3$ content=88.90% by weight; 0.4 mol of W) were added while continuing the flushing with nitrogen and the 60° C., and stirring was effected for 1 hour. Thereafter, 81.46 g of $Cs_2CO_3$ from ChemPur in 76204 Karlsruhe (100%; 0.5 mol of Cs) were added while maintaining the flushing with nitrogen and the 60° C. and stirring was carried out for a further hour. The resulting aqueous suspension was spray-dried as in comparative example 1. 100 g of the spray-dried powder were then subjected to a thermal treatment as in comparative example 2. The associated X-ray diffractogram of the resulting active material is shown in FIG. 4. It comprises virtually pure i-phase. The relative intensities and positions of the reflections of the i-phase contained are as follows:

| d [Å] | I [%] |
|---|---|
| 13.29 | 11 |
| 11.19 | 24 |
| 9.79 | 24 |
| 8.16 | 8 |
| 3.966 | 100 |
| 3.524 | 20 |
| 3.405 | 39 |
| 3.345 | 48 |
| 3.283 | 90 |
| 3.173 | 39 |
| 3.060 | 38 |
| 2.937 | 28 |
| 2.859 | 35 |

Example 3

$Cs_{0.5}[Mo_{3.5}V^{+4}{}_1Te_{0.5}O_{14}]_1$ 96.2 g of ammonium metavanadate from H.C. Starck ($V_2O_5$ content=75.6% by weight; 0.8 mol of $V^{5+}$) were dissolved at 80° C. in 6000 ml of water while flushing with nitrogen and stirring to give a clear yellowish solution. 618.2 g of ammonium heptamolybdate tetrahydrate from H.C. Starck ($MoO_3$ content=81.5% by weight; 3.4 mol of Mo) were then dissolved in this solution with stirring and while maintaining the 80° C. and the flushing with nitrogen. 10.19 g of elemental V powder from ChemPur in 76204 Karlsruhe (100% V; 0.2 mol of $V^{\pm 0}$) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. Thereafter, 114.82 g of telluric acid from Fluka (CH-9471 Buchs, 100%; 0.5 mol of Te) were first added while continuing the flushing with nitrogen and the 60° C., and stirring was effected for a further hour. Thereafter, 81.5 g of $Cs_2CO_3$ from ChemPur (100%; 0.5 mol of Cs) were added while maintaining the boundary conditions and stirring was carried out for a further hour.

The aqueous suspension obtained was spray-dried as in comparative example 1 and 100 g of the spray-dried powder obtained were heated from 25° C. to 275° C. with a linear ramp in the course of 50 minutes in a rotary bulb furnace according to FIG. 1 of DE-A 10122027 (1 l internal volume) under an air stream of 50 l(S.T.P.)/h and then kept at 275° C. for 30 minutes while maintaining the air stream.

Figure 5:
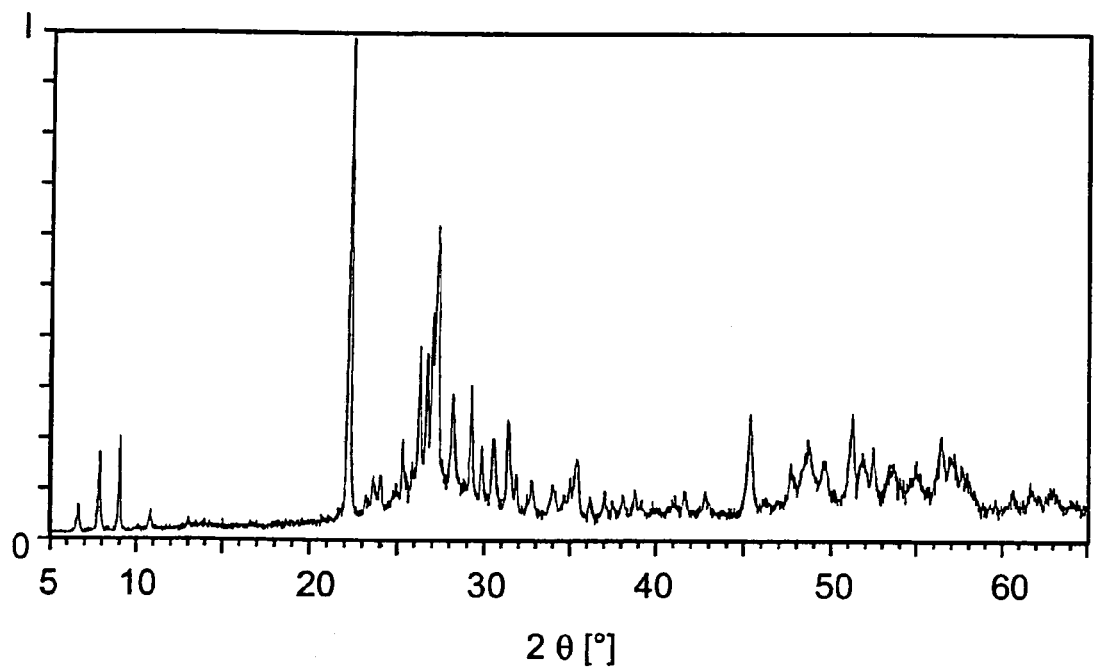

Thereafter, the air stream was replaced by a 50 l(S.T.P.)/h nitrogen stream and heating was effected from 275° C. to 600° C. in the course of 17 minutes and this temperature was maintained for 360 minutes while maintaining the nitrogen stream. Cooling to 25° C. was then effected while maintaining the nitrogen stream. The associated X-ray diffractogram of the active material is shown in FIG. 5. It comprises significant i-phase fractions. The relative intensities and positions of the reflections of the i-phase contained are as follows:

| d [Å] | I [%] |
|---|---|
| 13.29 | 7 |
| 11.22 | 17 |
| 9.80 | 20 |
| 8.27 | 4 |
| 4.000 | 100 |
| 3.520 | 20 |
| 3.394 | 38 |
| 3.341 | 38 |
| 3.275 | 62 |
| 3.170 | 29 |
| 3.058 | 30 |
| 2.930 | 20 |
| 2.856 | 24 |

Example 4

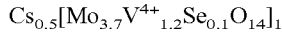

$Cs_{0.5}[Mo_{3.7}V^{4+}{}_{1.2}Se_{0.1}O_{14}]_1$ 115.5 g of ammonium metavanadate from H.C. Starck ($V_2O_5$ content=75.6% by weight; 0.96 mol of $V^{5+}$) were dissolved at 80° C. in 6000 ml of water while flushing with nitrogen and stirring to give a clear yellowish solution. 653.5 g of ammonium heptamolybdate tetrahydrate from H.C. Starck ($MoO_3$ content=81.5% by weight; 3.7 mol of Mo) were then dissolved in this solution with stirring and while maintaining the 80° C. and the flushing with nitrogen. 12.23 g of elemental V powder from ChemPur in 76204 Karlsruhe (100% V; 0.24 mol of $V^{\pm 0}$) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. Thereafter, 12.9 g of selenous acid ($H_2SeO_3$) from Fluka (CH-9471 Buchs; 100%; 0.1 mol of Se) were first added while continuing the flushing with nitrogen and the 60° C., and stirring was effected for a further hour. Thereafter, 81.5 g of $Cs_2CO_3$ from ChemPur (100%; 0.5 mol of Cs) were added while maintaining the boundary conditions and stirring was carried out for a further hour. The aqueous suspension obtained was spray-dried as in comparative example 1 and 100 g of the spray-dried powder obtained were heated from 25° C. to 275° C. with a linear ramp in the course of 50 minutes in a rotary bulb furnace according to FIG. 1 of DE-A 10122027 (1 l internal volume) under an air stream of 50 l(S.T.P.)/h and then kept at 275° C. for 30 minutes while maintaining the air stream. Thereafter, the air stream was replaced by a 50 l(S.T.P.)/h nitrogen stream and heating was effected from 275° C. to 650° C. in the course of 20 minutes and this temperature was maintained for 360 minutes while maintaining the nitrogen stream.

Cooling to 25° C. was then effected while maintaining the nitrogen stream. The associated X-ray diffractogram of the active material has significant i-phase fractions. The relative intensities and positions of the reflections of the i-phase contained are as follows:

| d [Å] | I [%] |
|---|---|
| 13.23 | 7 |
| 11.24 | 18 |
| 9.82 | 15 |
| 8.16 | 7 |
| 3.998 | 100 |
| 3.528 | 24 |
| 3.401 | 40 |
| 3.347 | 57 |
| 3.281 | 85 |
| 3.170 | 39 |
| 3.060 | 32 |
| 2.938 | 25 |
| 2.860 | 31 |

Example 5

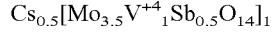

$Cs_{0.5}[Mo_{3.5}V^{+4}{}_1Sb_{0.5}O_{14}]_1$ 120.3 g of ammonium metavanadate from H.C. Starck ($V_2O_5$ content=75.6% by weight; 1 mol of $V^{5+}$) were dissolved at 80° C. in 6000 ml of water while flushing with nitrogen and stirring to give a clear yellowish solution. 618.2 g of ammonium heptamolybdate tetrahydrate from H.C. Starck ($MoO_3$ content=81.5% by weight; 3.5 mol of Mo) were then dissolved in this solution with stirring and while maintaining the 80° C. and the flushing with nitrogen. 45.02 g of anhydrous oxalic acid from Fluka (CH-9471 Buchs; 100%; 0.5 mol of oxalic acid) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. Thereafter, 72.9 g of antimony(III) oxide from Merck, Darmstadt (100% by weight; 0.5 mol of Sb) were first added while continuing the flushing with nitrogen and the 60° C., and stirring was effected for a further hour. Thereafter, 81.5 g of $Cs_2CO_3$ from ChemPur in 76204 Karlsruhe (100%; 0.5 mol of Cs) were added while maintaining the boundary conditions and stirring was carried out for a further hour. The aqueous suspension obtained was spray-dried as in comparative example 1 and 100 g of the spray-dried powder obtained were subjected to a thermal treatment as in example 3.

The associated X-ray diffractogram of the active material has significant i-phase fractions. The relative intensities and positions of the reflections of the i-phase contained are as follows:

| d [Å] | I [%] |
|---|---|
| 13.29 | 3 |
| 11.26 | 7 |
| 9.82 | 6 |
| 8.19 | 2 |

-continued

| d [Å] | I [%] |
|---|---|
| 4.000 | 100 |
| 3.510 | 13 |
| 3.404 | 17 |
| 3.340 | 17 |
| 3.278 | 33 |
| 3.176 | 21 |
| 3.057 | 15 |
| 2.933 | 13 |
| 2.856 | 15 |

Example 6

$Cs_{0.5}[Mo_{3.7}V^{+4}_{1.2}Bi_{0.1}O_{13.9}]_1$ 115.5 g of ammonium metavanadate from H.C. Starck ($V_2O_5$ content=75.6% by weight; 0.96 mol of $V^{5+}$) were dissolved at 80° C. in 6000 ml of water while flushing with nitrogen and stirring to give a clear yellowish solution. 653.5 g of ammonium heptamolybdate tetrahydrate from H.C. Starck ($MoO_3$ content=81.5% by weight; 3.7 mol of Mo) were then dissolved in this solution with stirring and while maintaining the 80° C. and the flushing with nitrogen. 12.23 g of elemental V powder from ChemPur in 76204 Karlsruhe (100% V; 0.24 mol of $V^{±0}$) were then added to the resulting clear aqueous solution with stirring and while maintaining the flushing with nitrogen and the 80° C., and stirring was then continued for 4 hours while maintaining the boundary conditions. The resulting dark blue-black aqueous suspension was cooled to 60° C. and stirred at this temperature for a further 12 hours while maintaining the flushing with nitrogen. Thereafter, 81.5 g of $Cs_2CO_3$ from ChemPur in 76204 Karlsruhe (100%; 0.5 mol of Cs) were first added while continuing the flushing with nitrogen and the 60° C., and stirring was effected for a further hour. Thereafter, 48.5 g of bismuth nitrate pentahydrate from Riedel de Haen, D-30926 Seelze (100%; 0.1 mol of Bi) were added while maintaining the boundary conditions and stirring was carried out for a further hour. The aqueous suspension obtained was spray-dried as in comparative example 1 and 100 g of the spray-dried powder obtained were subjected to a thermal treatment as in comparative example 2. The associated X-ray diffractogram of the active material has significant i-phase fractions. The relative intensities and positions of the reflections of the i-phase contained are as follows:

| d [Å] | I [%] |
|---|---|
| 13.28 | 10 |
| 11.23 | 14 |
| 9.80 | 14 |
| 8.11 | 10 |
| 3.990 | 100 |
| 3.533 | 33 |
| 3.407 | 59 |
| 3.346 | 57 |
| 3.279 | 72 |
| 3.173 | 41 |
| 3.059 | 47 |
| 2.934 | 25 |
| 2.863 | 29 |

Example 7

$Cs_{0.5}[Mo_{3.2}V^{+4}_1Nb_{0.4}Bi_{0.4}O_{13.45}]_1$ 120.3 g of ammonium metavanadate from H.C. Starck ($V_2O_5$ content=75.6% by weight; 1.0 mol of $V^{5+}$) were dissolved at 80° C. in 6000 ml of water while flushing with nitrogen and stirring to give a clear yellowish solution. 565.2 g of ammonium heptamolybdate tetrahydrate from H.C. Starck ($MoO_3$ content=81.5% by weight; 3.2 mol of Mo) were then dissolved in this solution with stirring and while maintaining the 80° C. and the flushing with nitrogen. 182.1 g of niobium oxalate from H.C. Starck (20.41% by weight of Nb; 0.4 mol of Nb) were then added to the resulting clear aqueous solution with stirring and while maintaining the flushing with nitrogen and the 80° C., and stirring was then continued for 1 hour while maintaining the boundary conditions. The resulting dark green solution was cooled to 60° C. Thereafter, while continuing the flushing with nitrogen and the 60° C., first 194.0 g of bismuth nitrate pentahydrate (Bi ($NO_3$)$_3$.5$H_2O$) from Riedel de Haen, D-30926 Seelze (100%; 0.4 mol of Bi) and then 81.5 g of $Cs_2CO_3$ from ChemPur in 76204 Karlsruhe (100%; 0.5 mol of Cs) were added and the resulting suspension was stirred for 20 minutes. Spray-drying was then effected as in comparative example 1. 100 g of the spray-dried powder obtained were subjected to a thermal treatment as in example 3. The associated X-ray diffractogram of the active material has significant i-phase fractions. The relative intensities and positions of the reflections of the i-phase contained are as follows:

| d [Å] | I [%] |
|---|---|
| 13.29 | 5 |
| 11.27 | 10 |
| 9.84 | 8 |
| 8.24 | 5 |
| 4.004 | 100 |
| 3.514 | 24 |
| 3.426 | 58 |
| 3.348 | 39 |
| 3.275 | 63 |
| 3.178 | 38 |
| 3.057 | 33 |
| 2.939 | 43 |
| 2.856 | 28 |

Example 8

100 g of the multimetal oxide material $Cs_{0.5}[Mo_{3.5}V^{+4}_1Te_{0.5}O_x]_1$ from example 3 in 1 l of 20% strength by weight aqueous $HNO_3$ were heated to 85° C. and refluxed at this temperature for 5 hours at atmospheric pressure.

After cooling of the aqueous suspension, the solid fraction was filtered off, washed five times with water and dried for 24 hours at 110° C. under reduced pressure in a drying oven.

The solids analysis gave the composition $Cs_{0.3}[Mo_{3.6}V_1Te_{0.4}O_y]_1$.

The X-ray diffractogram was identical to the X-ray diffractogram of the starting powder, although the Cs content was (relatively) reduced by 40% by the treatment with aqueous nitric acid.

We claim:
1. A multimetal oxide material of the formula I

$$A_a[Mo_{5-b-c}V_bX_cO_d]_1 \qquad (I),$$

where
- A is at least one of the elements selected from the group consisting of NH$_4$, Na, K, Rb, Cs and Tl;
- X is one or more of the elements selected from the group consisting of La, Ce, Pr, Nd, Pm, Sm, Eu, Gd, Tb, Dy, Ho, Er, Tm, Yb, Lu, Ti, Zr, Hf, Nb, Ta, W, Mn, Re, Fe, Co, Ni, Cr, Ru, Rh, Pd, Os, Ir, Pt, Cu, Ag, Au, Zn, Cd, Hg, B, Al, Ga, In, C, Si, Ge, Sn, Pb, P, As, Sb, Bi, S, Se and Te;
- a is from 0.1 to 1;
- b is from 0.25 to 4.5; and
- c is from 0 to 4.5, with the proviso that b+c≦4.5, whose X-ray diffractogram contains the following X-ray diffraction pattern XP, reproduced in the form of interplanar spacings d [Å] independent of the wavelength of the X-rays used,

| d [Å] |
|---|
| 3.06 ± 0.2 |
| 3.17 ± 0.2 |
| 3.28 ± 0.2 |
| 3.99 ± 0.2 |
| 9.82 ± 0.4 |
| 11.24 ± 0.4 |
| 13.28 ± 0.5. |

2. A multimetal oxide material as claimed in claim 1, wherein the X-ray diffraction pattern XP additionally has the following relative reflection intensities I (%) based on the intensity of the reflection representing the interplanar spacing d [Å]=3.99±0.2:

| d [Å] | I (%) |
|---|---|
| 3.06 ± 0.2 | 5 to 65 |
| 3.17 ± 0.2 | 5 to 65 |
| 3.28 ± 0.2 | 15 to 130 |
| 3.99 ± 0.2 | 100 |
| 9.82 ± 0.4 | 1 to 50 |
| 11.24 ± 0.4 | 1 to 45 |
| 13.28 ± 0.5 | 1 to 35. |

3. A multimetal oxide material as claimed in claim 1, in which A is at least one of the two elements Rb and Cs.

4. A multimetal oxide material as claimed in claim 1, in which X is one or more of the elements selected from the group consisting of Ti, Cr, W, Mn, Re, Fe, Co, Ni, Pd, Pt, Cu, Ag, Ga, Sn, Sb and Te.

5. A multimetal oxide material as claimed in claim 1, in which c is from 0.05 to 4.0.

6. A multimetal oxide material as claimed in claim 1, in which b is from 0.5 to 2.5.

7. A multimetal oxide material as claimed in claim 1, in which a is from 0.2 to 0.8.

8. A multimetal oxide material as claimed in claim 1, in which a is from 0.3 to 0.7.

9. A multimetal oxide material as claimed in claim 1, in which more than 25 mol % of the V contained therein is present in the oxidation state +4.

10. A multimetal oxide material as claimed in claim 1, in which more than 50 mol % of the V contained therein is present in the oxidation state +4.

11. A multimetal oxide material as claimed in claim 1, whose X-ray diffractogram additionally contains the following reflections:

| d [Å] |
|---|
| 8.19 ± 0.3 |
| 3.51 ± 0.2 |
| 3.42 ± 0.2 |
| 3.34 ± 0.2 |
| 2.94 ± 0.2 |
| 2.86 ± 0.2. |

12. A multimetal oxide material as claimed in claim 11, wherein the additional reflections have the following relative reflection intensities I (%) based on the intensity of the reflection representing the interplanar spacing d [Å]=3.99±0.2:

| d [Å] | I (%) |
|---|---|
| 8.19 ± 0.3 | 0 to 25 |
| 3.51 ± 0.2 | 2 to 50 |
| 3.42 ± 0.2 | 5 to 75 |
| 3.34 ± 0.2 | 5 to 80 |
| 2.94 ± 0.2 | 5 to 55 |
| 2.86 ± 0.2 | 5 to 60. |

13. A multimetal oxide material as claimed in claim 1, whose X-ray diffractogram additionally contains the following reflections:

| d [Å] |
|---|
| 2.54 ± 0.2 |
| 2.01 ± 0.2. |

14. A multimetal oxide material as claimed in claim 13, wherein the additional reflections have the following relative reflection intensities I (%) based on the intensity of the reflection representing the interplanar spacing d [Å]=3.99±0.2:

| d [Å] | I (%) |
|---|---|
| 2.54 ± 0.2 | 0.5 to 40 |
| 2.01 ± 0.2 | 5 to 60. |

15. A multimetal oxide material as claimed in claim 1, in whose X-ray diffractogram the reflection representing the interplanar spacing d [Å]=3.99±0.2 or the reflection representing the interplanar spacing d [Å]=3.28±0.2 is the reflection having the strongest intensity.

16. A multimetal oxide material as claimed in claim 1, in whose X-ray diffractogram the reflection representing the interplanar spacing d [Å]=3.99±0.2 has a 2θ full width at half height of ≦1°.

17. A process for the preparation of a multimetal oxide material as claimed in claim 1, comprising preparing a dry blend from suitable sources of the elemental constituents of the multimetal oxide material and subjecting said dry blend to a thermal treatment at a temperature from 350 to 1000° C.

18. A process as claimed in claim 17, wherein the thermal treatment is effected under inert gas.

19. A process as claimed in claim 17, wherein a mixture of at least one compound, which contains the element V in the oxidation state +5, and elemental vanadium is used as sources of the element V for the preparation of the dry blend.

20. A process for the preparation of multimetal oxides, wherein a multimetal oxide as claimed in claim 17 is first prepared and its content of elements A is then reduced relative to the content of Mo.

21. A process for the preparation of multimetal oxides, wherein a multimetal oxide as claimed in claim 17 is first prepared and this is then treated with a liquid.

22. A process as claimed in claim 21, wherein the liquid is an organic acid, an inorganic acid or an aqueous solution of acids thereof.

23. The process as claimed in claim 17, wherein the dry blend does not contain any of the following: Nb, Te, Sb, Nb and Te, or Nb and Sb.

24. A process for the preparation of a multimetal oxide material as claimed in claim 1, comprising preparing a dry blend from suitable sources of the elemental constituents of the multimetal oxide material and subjecting said dry blend to a thermal treatment first under an oxidizing atmosphere at a temperature from 150 to 400° C. and then under inert gas at a temperature from 350 to 1000° C.

25. In a process for at least one member selected from the group consisting of heterogeneously catalyzed partial gas-phase oxidations, and ammoxidations of at least one member selected from the group consisting of saturated hydrocarbons, unsaturated hydrocarbons, saturated aldehydes, and unsaturated aldehydes, the improvement wherein the process is carried out in the presence of a catalytically active material comprising a multimetal oxide as claimed in claim 1.

* * * * *